CURRENT SUMMING ARRANGEMENT FOR A MAGNETIC CORE MEMORY

Filed April 30, 1965

INVENTOR
HENRY R. FOGLIA

BY Sughrue, Rothwell, Mion, Zinn & Macpeak
ATTORNEYS

March 11, 1969 H. R. FOGLIA 3,432,835

CURRENT SUMMING ARRANGEMENT FOR A MAGNETIC CORE MEMORY

Filed April 30, 1965 Sheet 2 of 2

United States Patent Office 3,432,835
Patented Mar. 11, 1969

3,432,835
CURRENT SUMMING ARRANGEMENT FOR A MAGNETIC CORE MEMORY

Henry R. Foglia, Briarcliff Manor, N.Y., assignor to International Business Machines Corporation, Armonk, N.Y., a corporation of New York Filed Apr. 30, 1965, Ser. No. 452,182
U.S. Cl. 340—174 8 Claims
Int. Cl. G11b 5/00

ABSTRACT OF THE DISCLOSURE

A word organized core memory having individual drive lines threading all of the cores in each word. All of the drive lines are joined together at one end to form a common summing node or junction, and selectively controlled gates and drivers are connected to the other end of each drive line. If there are $n$ words in the memory, a full select switching current may be produced in the drive line of a selected word by actuating the gate for that line and concurrently energizing the drivers connected to the non-selected drive lines to each generate a current of $$\frac{1}{n-1}$$

times the full select magnitude. These fractional currents sum at the node to a full select value.

This invention relates in general to an information storage device and more particularly to a novel drive and/or digit line arrangement for a word organized, magnetic core memory.

Magnetic core memories are well known in the information storage art and generally comprise an ordered arrangement of toroidal cores fabricated from a material having a substantially square hysteresis loop. Such cores are bistable in the sense that they may be remnantly magnetized in either one of two conditions of opposite polarity, and thereby particularly lend themselves to the storage of information coded in accordance with a zero or one, yes or no, etc., scheme. When dealing with fixed groups of coded information characters, i.e., numbers, letters, special symbols, etc., it has been found convenient to designate such groups as words and to store each word together or assembled in a memory, rather than to store the individual characters of a word in scattered locations. A memory so arranged to store assembled words is referred to as a word organized memory.

If the length of the words being handled becomes relatively long a number of problems arise in connection with the peripheral circuitry required to write information into and read information out of the memory. Since it is common practice to read or write an entire word at a time, rather than handling each character separately, and since therefore a single read/write line threads all of the cores associated with each word, relatively strong driving and gating signals must be generated by the peripheral circuitry to effect each read or write operation. These strong signals are necessitated larged by the back E.M.F.'s induced in the drive lines by the inductively coupled cores and to a lesser extent by the normal signal attenuation inherent in the comparatively long drive lines. Not only is the circuitry required to generate these strong signals correspondingly large and expensive, but the signal magnitudes themselves result in the generation of excessive noise voltages which further detract from the reliability of the memory system.

It is, therefore, a primary object of this invention to provide a novel drive line arrangement for a word organized memory which effectively overcomes the above-noted disadvantages attendant with the prior art memory systems.

It is a further object of this invention to provide such a drive line arrangement in which read and write operations may be implemented by relatively low level driving and gating signals, thus reducing the overall power requirements for the peripheral circuitry and resulting in a substantially improved signal-to-noise ratio. The use of low powered peripheral circuitry provides additional advantages in the form of faster rise and fall times for the driving and gating signals, reduced delay times for such signals and improved memory efficiency.

It is a further object of this invention to provide such a drive line arrangement in which each word group is actively associated with two or more similar word groups. The drive lines for each of the word groups are joined at a common point to implement a current summing technique during each read or write operation, with the drive line of each non-selected word group contributing an equal share of the desired total current.

It is a further object of this invention to provide a word organized, core memory system in which transistors are employed to generate the driving signals with each gating signal providing the necessary supply voltage for the energized driving transistors.

It is a further object of this invention to provide such a memory system in which the digit lines coordinately associated with each core in the word groups are similarly arranged in a current summing configuration, thereby effecting corresponding reductions in the power requirements for the bit drivers associated with each digit line.

The foregoing and other objects, features and advantages of the invention will be apparent from the following more particular description of a preferred embodiment of the invention, as illustrated in the accompanying drawings.

Figure 1:
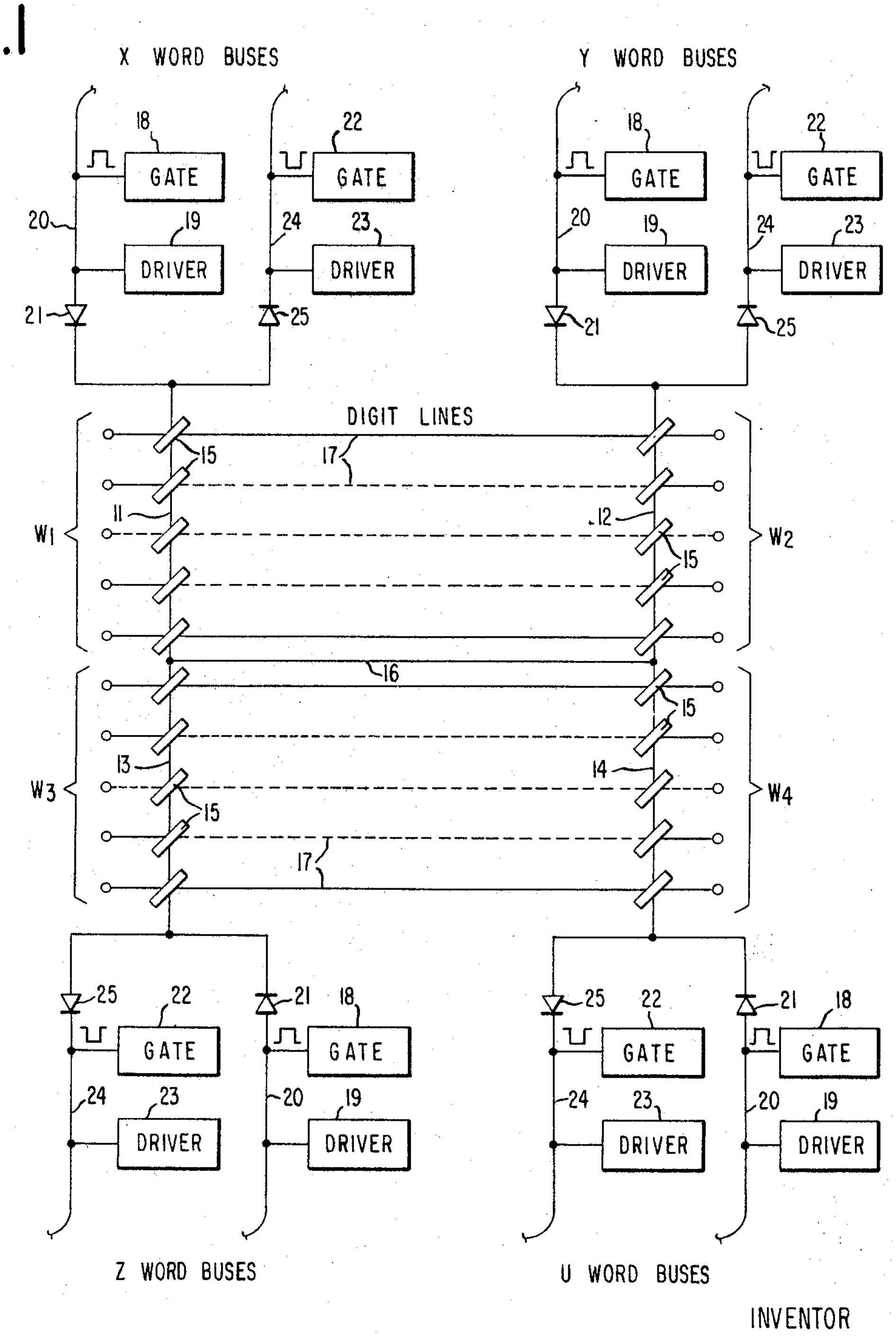
FIGURE 1 shows a four-word group or "quartuple" of a core memory provided with the novel drive line arrangement of this invention, including schematic representations of the associated peripheral circuitry.

Referring now to the drawings, in which the same reference numerals are used throughout the various figures to designate like structural elements, FIGURE 1 shows a four-word quartuple including four drive lines 11–14 each threading five bistable magnetic storage cores 15. The drive lines are all connected at one end to a common junction line 16, thus presenting an H configuration in the drawing. Each group of five cores represents a unique word in the memory, and the four words shown have been designated W1–4 for convenience. Each storage core in the arrangement shown is also threaded by a digit line 17 with each digit line common to two cores in corresponding bit positions of two different words. It is to be understood that five bit words have been illustrated only for the sake of simplicity, since in actual practice each word would normally include a far greater number of bits. In a typical application, for example, a word might consist of nine characters of eight bits each, or a total of seventy-two bits per word. Furthermore, while the invention will be described with reference to a four-word quartuple, it is not to be so limited, and the quartuple has been chosen by way of example only.

As will readily be appreciated by those skilled in the art, reading and writing operations may be accomplished in such a two-winding per core memory in a number of different ways. Reading may be performed, for example, by passing a full select current, i.e., a current of sufficient magnitude to overcome the remnant magnetization of an oppositely poled core and saturate it in the reverse direction, through the drive line of a word and sensing any output or switching signals generated over the digit lines. Writing may be implemented by passing a full select current through a drive line and concurrently passing lesser magnitude inhibit signals over certain of the digit lines. As an alternative, write operations may be performed by passing half select currents through a drive line and selected digit lines concurrently, the summation of two such currents being sufficient to switch the selected cores.

Each drive line is provided with a positive gate 18 and driver 19 connected to its free end through a branch line 20 and a positively poled diode 21, and with a negative gate 22 and driver 23 connected to its free end through a branch line 24 and a negatively poled diode 25. The free ends of the branch lines are fed into associated multi-line word buses, designated X, Y, Z and U in FIGURE 1, and hereafter individual gates, drivers, etc., will be referred to in connection with their respective word bus letters, such as X19, Y23, etc. The complete circuits for the digit lines, as well as the selecting means for the various gates and drivers, have been omitted in the interest of simplicity and also because they form no part of the invention. As will be understood by those persons skilled in the art, the digit lines are normally provided with peripheral circuitry for selectively generating driving and gating signals and with amplifier means for sensing read signals during readout operations, and the multi-line word buses lead to and interconnect the other word quartuples in the memory.

To illustrate the functioning of the novel current summing technique embodied in the circuit of FIGURE 1, both a read and a write operation will be described. If it is desired to read out word W1, for example, gate X18 is turned on along with drivers U23, Y23 and Z23. Under these conditions, a full select read current is drawn from gate X18 over branch line X20, through diode X21 and down through drive line 11 of word W1. This read current reverses the magnetization of all of the oppositely polarized cores 15 in word W1, and the flux reversals produced in such cores by the switching action induces pulses in their associated digit lines 17 indicative of their previous states of magnetization. These pulses are then detected by suitable sense amplifiers connected to the digit lines in a manner well known in the art. At the common end of drive line 11 the read current branches equally into the other three legs of the quartuple, with one third of it going through diode Z25 and into driver Z23. The remaining two thirds of the read current passes over junction line 16 and then divides equally into drive lines 12 and 14, ultimately flowing into the respective drivers Y23 and U23. The one-third select currents that flow through the drive lines 12, 13 and 14 are not of suffiient magnitude to permanently alter the magnetic states of the cores in words W2, W3 and W4, and consequently no storage alteration takes place in the unselected words. It will be readily appreciated that since each of the energized drivers need only supply one third of the required read current, the electrical and physical parameters of these components may be greatly reduced as compared with those employed in a conventionally arranged memory. Apart from the obvious size and cost factor improvement thus afforded, the corresponding reduction in the signal levels for the drivers results in faster response times and increased memory speeds as well as higher signal-to-noise ratios.

Assuming now that writing operations are performed by means of a full select current on a drive line and lesser magnitude inhibit signals on appropriate digit lines, the writing of information into word W2 will be described. With all of the cores 15 in word W2 reset by a previous read operation, writing is accomplished by simultaneously energizing gate Y22 and drivers U19, X19 and Z19. As described above in connection with the read cycle, each of the drivers supplies one third of the full select write current through its associated branch line and diode, and these currents flow through the non-selected drive lines 11, 13 and 14 and are summed at the common junction point of drive line 12. At the same time, lesser magnitude inhibit signals are passed over selected ones of the digit lines 17 to oppose the effect of the write current and prevent any switching or reverse magnetization in the corresponding cores 15. Since a full select current is required to switch any one of the cores, the opposing inhibit signals need not themselves be of full switching strength but may be of only fractional magnitude to accomplish their function, such as one third of the write current strength.

Once again, each of the energized drivers 19 has supplied only one third of the required write current and consequently the parameters of the drivers may be correspondingly reduced.

Figure 2:
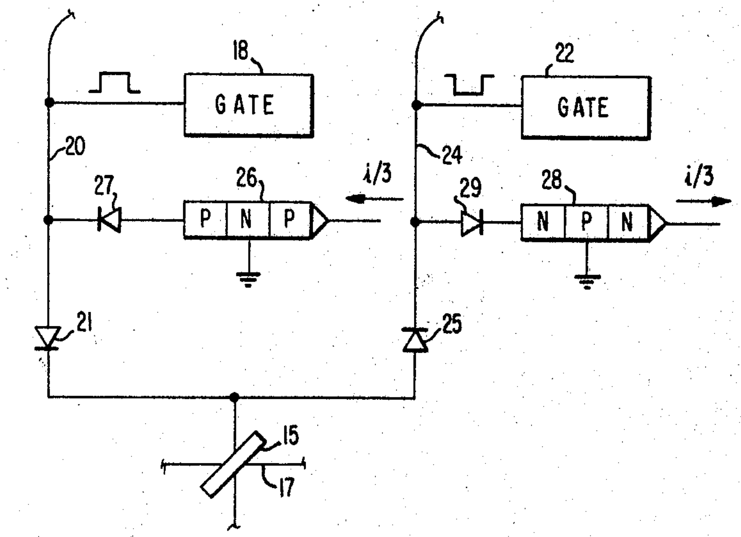
FIGURE 2 shows the driver transistor and gate arrangement provided for each drive line in a word quartuple.

Turning now to FIGURE 2, there is shown a possible transistorized driver configuration for the gate and driver circuitry associated with each drive line in a word quartuple. Essentially, the write driver consists of a grounded base, PNP transistor 26 whose collector is coupled to the branch line 20 through a positively poled diode 27 with the cathode of the latter connected to the anode of diode 21, and the read driver consists of a grounded base, NPN transistor 28 whose collector is coupled to the branch line 24 through a negatively poled diode 29. The anode of diode 29 is connected as shown to the cathode of diode 25. The emitter terminals of both transistors are connected to suitable selection gates, not shown, in a manner well known in the art. With this type of an arrangement the voltage pulse supplied by the energized gate during each read or write operation provides the supply voltage for each of the selected driver transistors, and the need for separate power supply sources is thereby obviated. In other words, during a write operation transistor 26 would be energized by the raising of its emitter potential. At the same time, the negative voltage pulse from the energized gate at the end of the selected drive line would be communicated through diodes 21 and 27 to the collector of transistor 26, thereby supplying the necessary operating potential for same and resulting in the generation of a one-third select current through the transistor in the direction shown by the arrow. In a similar manner, the energization of a positive gate during a read operation would cause a positive voltage pulse to pass through diodes 25 and 29 to the collector of transistor 28, thereby supplying the operating potential for same.

Figure 3:
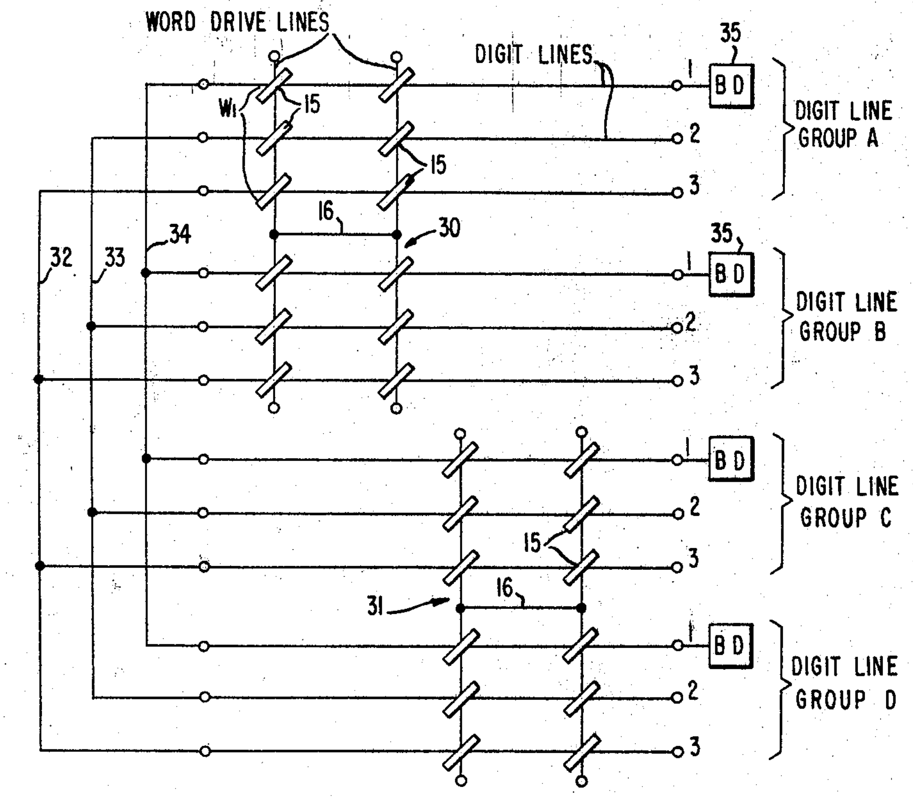
FIGURE 3 shows a current summing digit line arrangement for two-word quartuples.

FIGURE 3 shows a winding arrangement for implementing current summing in the digit lines of a memory as well as in the drive lines. The digit lines are shown for convenience as threading two word quartuples 30 and 31 each having three bits per word, although in actual practice many more quartuples would be handled by each group of digit lines. The lines that thread the cores in the same bit positions of each word in the quartuple are joined at their common ends by junction lines 32, 33 and 34, which correspond in function to the quartuple junction lines 16. The digit lines have been arranged in four groups A, B, C and D, each group having three digit lines. The other end of each digit line is connected to a bit driver 35 used to generate inhibit signals during write operations and to a sense amplifier, not shown, for use during read operations. If a write operation is being performed in word W1 of quartuple 30, for example, and it is desired to prevent the switching of the core in the first bit position, the bit drivers 35 for digit lines B1, C1 and D1 are energized. Each bit driver provides one third of the necessary inhibit signal. These currents are then summed in junction line 34 and provide the necessary one-third strength inhibit signal through digit line A1.

As may be seen then the current summing technique of this invention permits the employment of comparatively low powered peripheral circuitry for the digit lines to implement all of the necessary writing functions, with attendant reductions in noise generation and improved response times.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A magnetic core memory, comprising:

(a) $n$ individual word groups of magnetic cores, wherein $n$ is any whole number greater than two, (b) an equal number of individual drive lines each threading all of the cores in a group, each of the lines having a common end and a free end, (c) ungrounded junction means connecting together all of the common ends, and (d) separate means individually connected to the free ends of each of the lines for selectively generating driving signals each having a magnitude of $$\frac{1}{n-1}$$

times the value of a full select driving current, whereby a full select driving current may be provided in the drive line of any one of the word groups by generating driving signals of $$\frac{1}{n-1}$$

select current in each of the other lines.

2. A magnetic core memory, comprising:

(a) $n$ individual word groups of magnetic cores, wherein $n$ is any whole number greater than two, (b) an equal number of individual drive lines each threading all of the cores in a group, each of the lines having a common end and a free end, (c) ungrounded junction means connecting together all of the common ends, and (d) separate means individually connected to the free ends of each of the lines for selectively generating driving signals each having a magnitude of $$\frac{1}{n-1}$$

times the value of a full select driving current, and gating signals, whereby a full select driving current may be provided in the drive line of any one of the word groups by generating a gating signal for that line and concurrently generating driving signals of $$\frac{1}{n-1}$$

select current in each of the other lines.

3. A magnetic core memory as defined in claim 2 wherein each of the means recited in sub-paragraph (d) comprises:

(a) a positive gate and a driver connected to the free end of an associated drive line through a positively poled diode, and (b) a negative gate and a driver connected to the free end of the drive line through a negatively poled diode.

4. A magnetic core memory as defined in claim 3 wherein:

(a) the driver recited in sub-paragraph (a) comprises a grounded base PNP transistor whose collector is connected to the anode of the positively poled diode through a second positivley poled diode, and (b) the driver recited in sub-paragraph (b) comprises a grounded base NPN transistor whose collector is connected to the cathode of the negatively poled diode through a second negatively poled diode.

5. A drive line arrangement for a magnetic core memory in which four individual word groups of cores are associated together in a word quartuple, comprising:

(a) four individual drive lines each threading all of the cores in a word group in the same direction, with each drive line having a common end and a free end, (b) ungrounded junction means electrically connecting all of the common ends of the drive lines together, (c) selectively energizable driving means for supplying one third of the full select driving current for summation in the junction means individually connected to the free ends of each of the drive lines, and (d) gating means individually connected to the free ends of each of the drive lines, whereby a full select driving current may be provided in any one of the drive lines by concurrently energizing the gating means associated with that drive line and the driving means associated with the other three drive lines [each of the energized driving means supplying one third of the full select driving current for summation in the junction means].

6. A drive line arrangement for a magnetic core memory as defined in claim 5 wherein the means recited in sub-paragraph (c) comprises:

(a) a positive gate and a driver connected to the free end of each drive line through a positively poled diode, and (b) a negative gate and a driver connected to the free end of each drive line through a negatively poled diode.

7. A digit line arrangement for a magnetic core memory including a plurality of word groups of cores of equal lengths, comprising:

(a) $n$ separate digit lines each threading the cores having like bit positions in each of the word groups, each digit line having a common end and a free end, (b) ungrounded junction means connecting all of the common ends of the digit lines threading cores in like bit positions together in a plurality of separate bit groups, and (c) selectively energizable bit driver means for generating signals each having a magnitude of $$\frac{1}{n-1}$$

times the value of a full strength inhibit signal connected to the free end of each digit line, whereby a full strength inhibit signal may be provided in any one of the digit lines by energizing the bit drivers associated with each of the other digit lines in the same bit group, each of said other digit lines supplying an equal share of the full strength inhibit signal for summation in the junction means.

8. A digit line arrangement for a magnetic core memory including at least two word quartuples each having four word groups of cores of equal lengths, comprising:

(a) $n$ separate digit lines each threading the cores having like bit positions in at least two of the word groups of cores in each quartuple, each digit line having a common end and a free end, (b) ungrounded junction means connecting all of the common ends of the digit lines threading cores in like bit positions together in a plurality of separate bit groups, and (c) selectively energizable bit driver means for generating signals each having a magnitude of $$\frac{1}{n-1}$$

times the value of a full strength inhibit signal connected to the free end of each digit line, whereby a full strength inhibit signal of predetermined magnitude may be provided in any one of the digit lines by energizing the bit drivers associated with each of the other digit lines in the same bit group, each of said other digit lines supplying an equal share of the full strength inhibit signal for summation in the junction means.

References Cited

UNITED STATES PATENTS

| | | | |
|---|---|---|---|
| 3,319,233 | 5/1967 | Amemiya et al. | 340—174 |
| 3,343,147 | 9/1967 | Ashwell | 340—174 |

FOREIGN PATENTS

| | | |
|---|---|---|
| 960,814 | 6/1964 | Great Britain. |

BERNARD KONICK, *Primary Examiner.*

GARY M. HOFFMAN, *Assistant Examiner.*